United States Patent [19]

Rodet

[11] Patent Number: 5,217,368
[45] Date of Patent: Jun. 8, 1993

[54] PROCESS AND APPARATUS FOR THE THERMAL TREATMENT OF MINERALS IN POWDERY FORM

[75] Inventor: Pierre Rodet, Bransles, France
[73] Assignee: FCB, Montreuil, France
[21] Appl. No.: 832,362
[22] Filed: Feb. 7, 1992

[30] Foreign Application Priority Data

Feb. 8, 1991 [FR] France ................................ 91 01445

[51] Int. Cl.⁵ .......................................... F27B 15/00
[52] U.S. Cl. ................................. 432/106; 432/58; 432/14
[58] Field of Search ................ 432/103, 106, 58, 14

[56] References Cited

U.S. PATENT DOCUMENTS

| | | | |
|---|---|---|---|
| 3,836,323 | 9/1974 | Engel | 432/106 |
| 4,094,626 | 6/1978 | Boyhont et al. | 432/58 |
| 4,669,976 | 6/1987 | Hatano et al. | 432/14 |
| 4,685,970 | 8/1987 | Krennbauer et al. | 432/106 |
| 4,695,325 | 9/1987 | Enkegaard | 432/106 |
| 4,715,811 | 12/1987 | Lawall | 432/106 |
| 5,026,275 | 6/1991 | Hundebol | 432/106 |

*Primary Examiner*—Henry C. Yuen
*Attorney, Agent, or Firm*—Collard & Roe

[57] ABSTRACT

A process and apparatus to treat powdered minerals placed in gaseous suspension by thermal exchange. The process includes the steps of preheating the minerals to be treated by the exhaust gas from a furnace. The minerals are then treated in the furnace. The minerals are then cooled with a stream of air prior to introducing the stream of air into the furnace. The furnace exhaust gases are filtered before being released into the atmosphere. A majority of the filtrate is mixed with the minerals leaving the furnace. The remainder of the filtrate is placed in suspension in a current of air diverted from the current of warm air which cools the minerals leaving the furnace. The remainder of the filtrate is separated from the air. The remainder of the filtrate is then mixed with the treated minerals and at least partially cooled. The diverted air is mixed with the furnace exhaust gases.

6 Claims, 1 Drawing Sheet

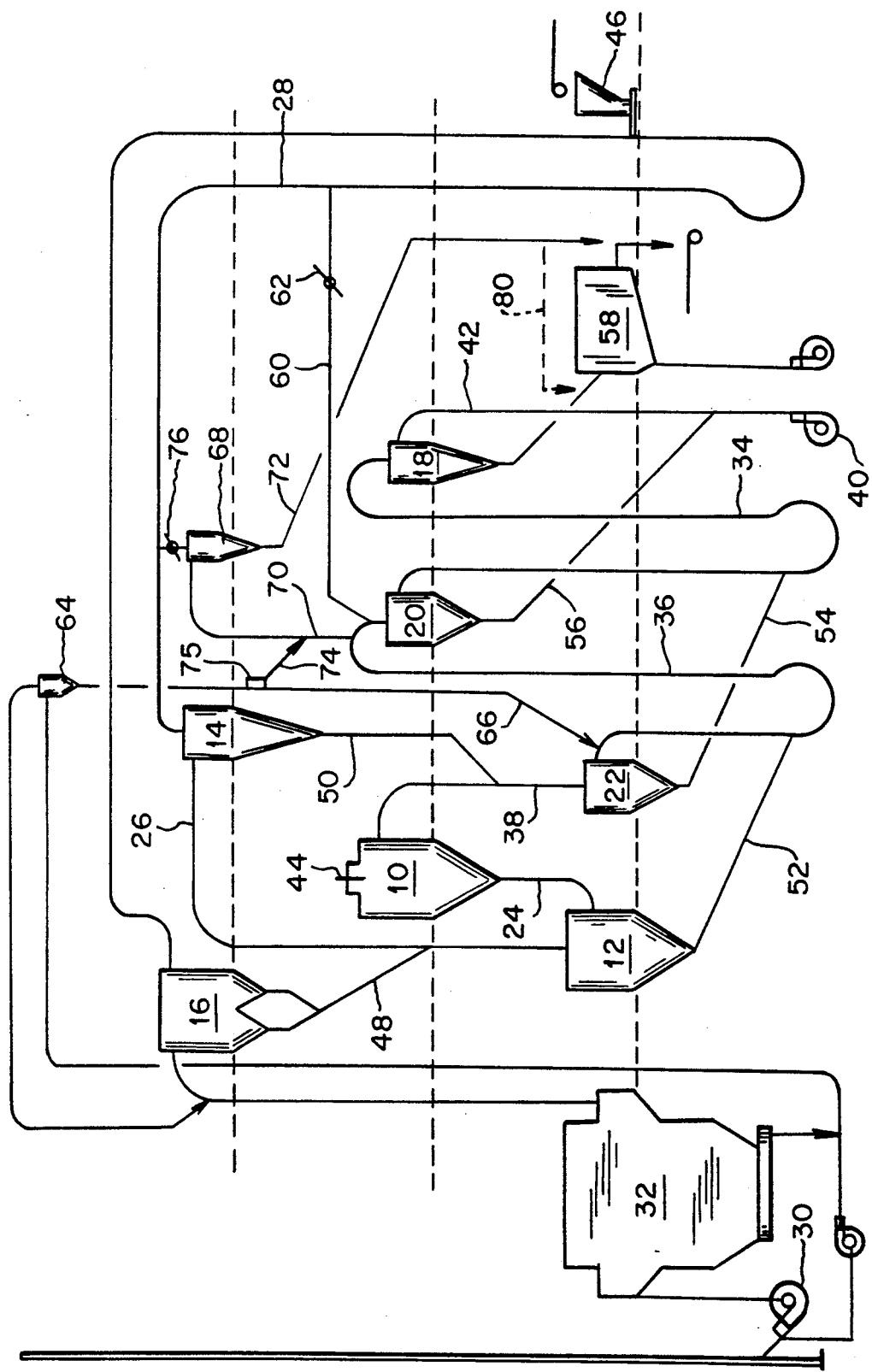

PROCESS AND APPARATUS FOR THE THERMAL TREATMENT OF MINERALS IN POWDERY FORM

BACKGROUND OF THE INVENTION

1. Field of the Invention

The present invention relates to a process and apparatus for the thermal treatment of powdered minerals which are suspended in a gas. More specifically, it relates to processes and an apparatus where the materials ar preheated and are treated in suspension in a current of warm gases produced by the combustion of air and a fuel injected into a furnace. There are two groups of cyclone separators, one group placed upstream of, and one group placed downstream of, the furnace. The cyclones are connected together and to the furnace by means of pipes arranged so that the exhaust gases from the furnace pass successively into all the cyclones of a set. A current of air traverses all the cyclones of the other set before entering the furnace in which it is used as combustion air.

Heat transfer between the materials to be treated and the furnace exhaust gases, on the one hand, and between the treated materials and the air, on the other, are accomplished partially in the cyclone and partially in the pipes where the materials are suspended in a gas. The cyclones separate the material from the gaseous current. The material is again placed in suspension in an upstream portion of the gas circuit, so as to achieve counter-current heat transfer throughout.

2. The Prior Art

At the outlet of the first set of cyclones, where the materials are preheated, the exhaust gases pass into a filter, generally an electro-filter, before being released into the atmosphere. Most of the dust collected in this filter is reintroduced into the apparatus. In order to avoid clogging of the filters by progressive accumulation of dust from the gas circuit, a portion of the dust is either released to the atmosphere, or mixed with the final product.

This release of dust results in a production loss. The mixing of the dust from the filters with the final product causes the latter to contain a small, but not negligible, percentage of dust which has not been treated. For certain applications, this may present a disadvantage. For example, in the calcination of alumina, the presence of alumina hydrate in the finished product may be troublesome. Such a result may also be unacceptable in the calcination of phosphates.

SUMMARY OF THE INVENTION

It is an object of the present invention to eliminate the aforementioned drawbacks of the prior art and provide a process and apparatus which assures that the portion of the dust which cannot be returned to the main gas circuit undergoes thermal treatment.

This object is achieved according to the present invention by a process which treats powdered minerals suspended in a gas by heat transfer. The process includes the following steps. First, the minerals to be treated are preheated by the exhaust gas from a furnace. The minerals are then treated in the furnace. The minerals are then cooled with a stream of air prior to introducing the stream of air into the furnace. Next, the furnace exhaust gases are filtered before releasing the exhaust gases into the atmosphere. A majority of the filtrate is mixed with the minerals leaving the furnace. The remainder of the filtrate is placed in suspension in a current of air diverted from the current of warm air which cooled the minerals leaving the furnace. Next, the remainder of the filtrate is separated from the diverted air. The remainder of the filtrate is mixed with the treated minerals, which are at least partially cooled. The diverted air is then mixed with the furnace exhaust gases. Alternatively, a fuel may be injected into the diverted air.

The apparatus according to the invention includes a outlet and a furnace with an intake and an exhaust. Two sets of cyclone separators are provided having inlets and outlets. The two set of cyclones include a first set of cyclones located upstream of the furnace, and a second set of cyclones located downstream of the furnace. A plurality of pipes serially connect the furnace exhaust to the first set of cyclones. Other pipes serially connect the second set of cyclones to the furnace intake. A filter for removing dust from the furnace exhaust gases is provided. Also, an auxiliary exchanger is provided, which includes an auxiliary cyclone with an intake and ga and dust outlets. An auxiliary pipe connects an inlet of the auxiliary cyclone to one of the outlets of one of the cyclones of the second set. The outlet of the auxiliary cyclone is connected to one of the plurality of pipes connected to one of the outlets of one of the cyclones of the first set. Also provided are means to feed the auxiliary exchange with a portion of the filter dust. The auxiliary cyclone has a diameter smaller than that of the cyclones of the two sets of cyclones, and has a greater efficiency than the cyclones of the two sets.

The auxiliary exchanger may optionally include a burner. The dust outlet of the auxiliary cyclone may be connected to the outlet of the apparatus. The apparatus may also include a supplementary cooler having an intake connected to the second set of cyclones, and an output connected to the outlet of the apparatus. The dust outlet of the auxiliary cyclone may be connected to the intake of the supplementary cooler.

BRIEF DESCRIPTION OF THE DRAWINGS

Other objects and features of the present invention will become apparent from the following detailed description considered in connection with the accompanying drawing, which disclose two embodiments of the present invention. It should be understood, however, that the drawing is designed for the purpose of illustration only and not as a definition of the limits of the invention.

In the drawing, the figure shows a diagram of a calcination apparatus and process for thermal treatment in accordance with the invention.

DETAILED DESCRIPTION OF PREFERRED EMBODIMENTS

The apparatus shown in the drawing includes a furnace 10 for the calcination of solid particles suspended in a carrier gas. A first set of cyclone separators 12, 14 and 16 and a second set of cyclone separators 18, 20 and 22 are also shown.

Furnace 10 is connected to cyclone 12 by pipe 24 Cyclone 12 is connected to cyclone 14 by pipe 26. Cyclone 14 is connected to cyclone 16 by pipe 28. The exhaust gases from furnace 10 successively traverse the cyclones 12, 14 and 16, in this order, while circulating through pipes 24, 26 and 28. At the outlet of cyclone 16, the gases are drawn off by a fan 30 and pass through a dust-removal filter 32 and are released into the atmosphere.

Cyclone 18 of the second set is connected to cyclone 20 by pipe 34. Cyclone 20 is connected to cyclone 22 by pipe 36. Cyclone 22 is connected to the furnace 10 by pipe 38. Air blown by a fan 40 into a pipe 42 enters the inlet of cyclone 18 and successively traverses cyclones 18, 20 and 22 before entering furnace 10 in which it is used as combustion air to burn a fuel injected by a pipe 44.

A feeder mechanism 4 makes it possible to introduce the products to be treated into pipe 28 in which they are placed. The products are placed in gaseous suspension and channeled to cyclone 16. In cyclone 16, the products are separated from the gases and collected in its lower portion from which they are removed by gravity by means of a pipe 48 connecting the outlet of the cyclone 16 to the pipe 26. In pipe 26, the products again are suspended in a gas and are transported to cyclone 14. They then are separated from the carrier gas current and routed to pipe 38 by a pipe 50. The air circulating in pipe 38 transports the products which have been preheated by the exhaust gases circulating in pipes 26 and 28 and cyclones 14 and 16 into furnace 10. In furnace 10, the products ar maintained in suspension in the current of air and are calcined by means of the heat supplied by the combustion of the air and the fuel injected by pipe 44.

The combustion gases are drawn off at the lower portion of furnace 10, carrying along the calcined products and are transported through pipe 24 into cyclone 12. The calcined products separated from the exhaust gases in cyclone 12 are introduced into pipe 36 by means of a pipe 52 which is connected to the outlet of cyclone 12. The calcined products pass successively into cyclone 22, pipe 54, pipe 34, cyclone 20, pipe 56, pipe 42 and cyclone 18. On this path, the calcined products encounter increasingly cooler air which lowers their temperature. At the outlet of cyclone 18, the calcined products may undergo an additional cooling in a cooler 58 and then be routed to the stockpile areas or weigh stations.

A pipe 60 connecting the outlet of cyclone 20 to pipe 28 makes it possible for a fraction of the cooling air to short-circuit furnace 10 to avoid excessive dilution of the combustion gases. The flow of air short-circuiting furnace 10 may be regulated by means of a flow restriction valve 62 or any other appropriate means.

Before being released into the atmosphere, exhaust gases from furnace 10 are cleared of dust by filter 32. The dust collected is transported pneumatically to a cyclone 64 positioned in the upper portion of the apparatus. Most of the dust separated from the carrier gas in cyclone 64 is reintroduced into the apparatus, immediately above the inlet of the cyclone 22, by a pipe 66.

In accordance with this invention, the other portion of the dust is treated in a heat exchanger composed of a cyclone 68 and a pipe 70 connecting outlet of the cyclone 20 to the inlet of cyclone 68. The gas outlet of cyclone 68 is joined to pipe 28 and the dust leaving this cyclone is channeled, by a pipe 72, to the outlet of cooler 58 where it is mixed with the cool treated materials. A pipe 7 connected to pipe 66 makes it possible to introduce a portion of the dust into pipe 70. The flow of dust diverted to pipe 70 may be regulated by means of a valve 75. A control flow restriction valve 76 positioned on the pipe connecting the gas outlet of cyclone 68 to pipe 28 makes it possible to regulate the flow of air passing through cyclone 68.

The diameter of cyclone 68 is clearly smaller than that of cyclones 12, 14, 16, 18, 20 and 22, and its performance is accordingly much better. Practically all the dust introduced into pipe 70 is collected at the intake of cyclone 68. The flow of dust which is extracted continuously from the main gas circuit is sufficient to maintain the feed of exhaust gas dust at a rate appropriate for preventing clogging of the filter. Furthermore, the thermal treatment which this dust undergoes in the exchanger 68, 70 makes it possible to mix it without difficulty with the treated materials in the apparatus. For example, in apparatus for calcination of alumina, alumina hydrate may be calcined or at least converted to alumina monohydrate, with less difficulty. If necessary, the exchanger 68, 70 may be equipped with a burner to complete the calcination.

Instead of being connected to the ga outlet of cyclone 20, the inlet of cyclone 68 may be connected to the outlet of cyclone 22. The dust leaving cyclone 68 could be channeled to the inlet of cooler 58, for example, by pipe 80. It is well understood that these modifications and all those resulting from the substitution of equivalent methods are contained within the scope of the invention.

While two embodiments of the present invention have been shown and described, it is to be understood that many changes and modifications may be made thereunto without departing from the spirit and scope of the invention as defined in the appended claims.

What is claimed is:

1. A process for treating powdered minerals suspended in a gas by heat exchange, comprising the steps of:

preheating the minerals to be treated by the exhaust gas from a furnace;

treating the minerals in the furnace;

cooling the minerals with a stream of air prior to introducing the stream of air into the furnace;

filtering the furnace exhaust gases before releasing the exhaust gases into the atmosphere;

mixing a majority of the filtrate with the minerals leaving the furnace;

placing the remainder of the filtrate in suspension in a current of air diverted from the current of warm air which cooled the minerals leaving the furnace;

separating the remainder of the filtrate from the diverted air;

mixing the remainder of the filtrate with the treated minerals at least partially cooled; and mixing the diverted air with the furnace exhaust gases.

2. The process according to claim 1, additional comprising the step of a fuel into the diverted air.

3. An apparatus with an outlet for treating powdered minerals suspended in a gas, comprising:

a furnace with an intake and an exhaust;

two sets of cyclones having inlets and outlets, including a first set of cyclones located upstream of the furnace and a second set of cyclones located downstream of the furnace;

a plurality of pipes serially connecting said furnace exhaust to said first set of cyclones and serially connecting said second set of cyclones to said furnace intake;

a filter for removing dust from said exhaust;

an auxiliary exchanger including an auxiliary cyclone with an intake and gas and dust outlets and a auxiliary pipe which connects the intake of said auxiliary cyclone to one of said outlets of one of said cyclones of said second set, said gas outlet of said auxiliary cyclone being connected to one of said plurality of pipes connected to one of said outlets of on of said cyclones of said first set; and means to feed said auxiliary exchanger with a portion of the filtered dust and said auxiliary cyclone having a diameter smaller than that of the cyclones of said two sets of cyclones and having a greater efficiency than the cyclones of said two sets of cyclones.

4. The apparatus as claimed in claim 3, wherein said auxiliary exchanger includes a burner.

5. The apparatus as claimed in claim 3, wherein said dust outlet of said auxiliary cyclone is connected to the outlet of the apparatus.

6. The apparatus a claimed in claim 3, additionally including a supplementary cooler having an input connected to said second set of cyclones and a output connected to the outlet of the apparatus, said dust outlet of said auxiliary cyclone being connected to said input of said supplementary cooler positioned between said second set of cyclones and the outlet of the apparatus.

* * * * *